(12) United States Patent
Grasreiner

(10) Patent No.: US 10,227,944 B2
(45) Date of Patent: Mar. 12, 2019

(54) METHOD FOR DETECTING DEFECTIVE INJECTION NOZZLES OF AN INTERNAL COMBUSTION ENGINE

(71) Applicant: Bayerische Motoren Werke Aktiengesellschaft, Munich (DE)

(72) Inventor: Sebastian Grasreiner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/454,664

(22) Filed: Mar. 9, 2017

(65) Prior Publication Data

US 2017/0184044 A1 Jun. 29, 2017

Related U.S. Application Data

(63) Continuation of application No. PCT/EP2015/069411, filed on Aug. 25, 2015.

(30) Foreign Application Priority Data

Sep. 15, 2014 (DE) .................. 10 2014 218 430

(51) Int. Cl.
*F02D 41/00* (2006.01)
*F02D 41/22* (2006.01)
(Continued)

(52) U.S. Cl.
CPC ......... *F02D 41/221* (2013.01); *F02D 41/008* (2013.01); *F02D 41/0082* (2013.01);
(Continued)

(58) Field of Classification Search
CPC .. F02D 41/221; F02D 41/008; F02D 41/0082; F02D 41/08; F02D 41/1454;
(Continued)

(56) References Cited

U.S. PATENT DOCUMENTS

| 5,585,552 A | 12/1996 | Heuston et al. |
| 2011/0113756 A1 | 5/2011 | Yezerets et al. |
| 2015/0176517 A1 | 6/2015 | Park et al. |

FOREIGN PATENT DOCUMENTS

| DE | 196 20 038 A1 | 11/1997 |
| DE | 601 22 657 T2 | 9/2007 |

(Continued)

OTHER PUBLICATIONS

International Search Report (PCT/ISA/210) issued in PCT Application No. PCT/EP2015/069411 dated Oct. 26, 2015 with English translation (seven pages).

(Continued)

*Primary Examiner* — Hai Huynh
*Assistant Examiner* — Gonzalo Laguarda
(74) *Attorney, Agent, or Firm* — Crowell & Moring LLP

(57) ABSTRACT

A method for detecting defective injection nozzles that deliver fuel into the combustion chambers of an internal combustion engine includes determining the standard deviation values for the respective injection nozzles and of the total leakage flow via a computation. The computation involves solving an equation for a respective test step that describes the standard deviation values and the total leakage flow as a function of the mixture factors set in a respective test step, a lambda value that is valid for a respective test step and that is derived from the measurements of the lambda value, and an air mass flow that is valid for the respective test step and that is derived from the measurements of the air mass flow.

12 Claims, 2 Drawing Sheets

(51) Int. Cl.
*F02D 41/08* (2006.01)
*F02D 41/14* (2006.01)
(52) U.S. Cl.
CPC ......... *F02D 41/08* (2013.01); *F02D 41/1454* (2013.01); *F02D 2041/225* (2013.01); *Y02T 10/40* (2013.01)
(58) Field of Classification Search
CPC .. F02D 41/1455; F02D 41/1456; F02D 41/18; F02D 2041/225
USPC ............... 123/672, 479; 701/103, 107, 109; 73/114.32, 114.38, 114.42
See application file for complete search history.

(56) References Cited

FOREIGN PATENT DOCUMENTS

| DE | 10 2014 203 636 A1 | 6/2015 |
|---|---|---|
| EP | 1 215 386 A2 | 6/2002 |
| WO | WO 2014/020393 A1 | 2/2014 |

OTHER PUBLICATIONS

German-language Written Opinion (PCT/ISA/237) issued in PCT Application No. PCT/EP2015/069411 dated Oct. 26, 2015 (six pages).
German Search Report issued in counterpart German Application No. 10 2014 218 430.4 dated Aug. 19, 2015 with partial English translation (10 pages).

METHOD FOR DETECTING DEFECTIVE INJECTION NOZZLES OF AN INTERNAL COMBUSTION ENGINE

CROSS REFERENCE TO RELATED APPLICATIONS

This application is a continuation of PCT International Application No. PCT/EP2015/069411, filed Aug. 25, 2015, which claims priority under 35 U.S.C. § 119 from German Patent Application No. 10 2014 218 430.4, filed Sep. 15, 2014, the entire disclosures of which are herein expressly incorporated by reference.

BACKGROUND AND SUMMARY OF THE INVENTION

The embodiments of the invention are directed to a method for detecting defective injection nozzles for delivering fuel into the combustion chambers of an internal combustion engine, in particular in a motor vehicle, as well as a suitable engine test device for detecting defective injection nozzles.

Internal combustion engines with direct injection include injection nozzles for the fuel supply to the individual combustion chambers in the cylinders. The injection nozzles ensure that the target mixture quality (air-fuel ratio) is suitably adjusted according to the requirements of the engine mode.

Injection nozzle defects in internal combustion engines are often hard to identify in the installed state of the injection nozzles. Consequently, in the event of malfunctions of an internal combustion engine, the cause of which could lie in defective injection nozzles, the nozzles are often replaced on suspicion. In many cases this results in the erroneous replacement of injection nozzles without defects. As a consequence, repeated repairs are necessary. Furthermore, the warranty costs of the engine manufacturer increase owing to unnecessary repairs.

It is an object of the embodiments of the invention to provide a method and a suitable engine test device, with which injection nozzle defects can be reliably detected with an indication regarding the type of the defect without having to remove the injection nozzles from the internal combustion engine.

This and other objects are achieved by a method for detecting defective injection nozzles for delivering fuel into the combustion chambers of an internal combustion engine, in particular in a motor vehicle. The internal combustion engine includes one or more cylinder banks, in which a respective cylinder bank includes a plurality of cylinders, each with a combustion chamber formed therein and at least one injection nozzle. In a preferred embodiment, exactly one injection nozzle is provided in each combustion chamber. A common air mass flow is delivered into the combustion chambers of a respective cylinder bank. Likewise, a common exhaust gas flow is discharged from the combustion chambers of a respective cylinder bank.

A number of consecutive test steps may be carried out for a respective cylinder bank in the idle mode of the internal combustion engine. The number of the test steps may be greater than the number of cylinders of the respective cylinder bank. This is necessary because otherwise the equation system described further below cannot be uniquely solved. In a respective test step, mixture factors are set for the individual injection nozzles that determine the respective fuel mass flow through the individual injection nozzle that is produced when the nozzle is actuated, in which for at least some, and in particular all, consecutive test steps one or more mixture factors are changed from one test step to the next and in which measurements of the lambda value of the exhaust gas flow discharged from the cylinder bank (for example by means of a lambda probe) and measurements of the air mass flow supplied to the cylinder bank are carried out during the test steps. The masses can be accounted for using the measurement of air mass (inwards) and the exhaust gas lambda (outwards). The changes of the mixture factors are in particular selected so that the system of equations described below has a unique solution. The lambda value term (also referred to as the air-fuel ratio) is determined and describes the air-fuel ratio in relation to the fuel-specific stoichiometric air-fuel ratio.

After performing the number of test steps, a standard deviation value for each injection nozzle as well as a total leakage flow are determined. The standard deviation value for a respective injection nozzle describes a deviation of the fuel mass flow produced by the respective injection nozzle from a standard operating value of the respective injection nozzle. The standard operating value of an injection nozzle means here and below the value of the fuel mass flow produced by an intact injection nozzle at the current operating point. In contrast, the total leakage flow describes the fuel mass flow that is caused by the leakage of all the injection nozzles of the respective cylinder bank.

In the method according to the invention, the determination of the standard deviation values for the respective injection nozzles and of the total leakage flow is carried out so that a system of equations that includes an equation for a respective test step can be solved by a computer. The equation accounts for the standard deviation values and the total leakage flow depending on: the mixture factors set in the respective test step, a lambda value of the exhaust gas flow discharged from the cylinder bank that is valid for the respective test step and that is derived from the measurements of the lambda value, and an air mass flow that is delivered to the cylinder bank that is valid for the respective test step and that is derived from the measurements of the air mass flow.

The lambda value or the air mass flow that is valid for the respective test step can be derived differently from the corresponding measurements depending on the configuration of the method. If a plurality of measurements of the lambda value or of the air mass flow are carried out in an individual test step, the valid lambda value or air mass flow in the respective test step can be determined by averaging the measurement values. In relation to the air mass flow, it can also be assumed therefrom that the air mass flow remains constant within the number of test steps, so that an air mass flow that is valid for all test steps is used that constitutes an average of the measurement values of the air mass flow across all the test steps. It may also be possible that the air mass flow or the lambda value is only ever measured once in an individual test step. The valid values in the respective test step then coincide with the corresponding measured values.

After the standard deviation values and the total leakage flow have been determined, in the method according to the invention a first injection nozzle defect in the respective cylinder bank in the form of an injection quantity deviation of at least one injection nozzle is detected if at least one standard deviation value for a respective injection nozzle lies outside a predefined range of values. Furthermore, a second injection nozzle defect is detected in the respective cylinder bank in the form of a leak of at least one injection nozzle if the total leakage flow is greater than the predefined threshold value or the maximum value thereof. Suitable ranges of values or threshold values can easily be determined by a person skilled in the art. Preferred values for the threshold value or the range of values are to be found in the specific description. A detected first or second injection nozzle defect is preferably output by means of a user interface or placed in a suitable digital memory for subsequent read-out.

The method according to the invention has the advantage that in a simple way by multiple adjustment of the fuel mixture, not only can injection nozzle defect be detected, but it can also be distinguished whether the fault indicator of the defect is in the form of an injection quantity deviation and/or a leak. An injection quantity deviation is distinguished from a leak defect in that the injection quantity deviation only occurs when the injection nozzle is turned on (i.e. during the injection of fuel through the nozzle), whereas the leak is also present if the injection nozzle is turned off and no fuel should be being injected.

In a preferred embodiment, within the method according to the invention an output can also be provided indicating for which injection nozzles the standard deviation value lies outside the predefined range of values. The injection nozzles are detected as defective. In this way, the association of the injection quantity deviation defect with the corresponding injection nozzles is achieved. The output of injection nozzles with a standard deviation value outside the predefined range of values can for example be carried out by means of a user interface. An output can also mean storing the corresponding information in a digital memory that can be analyzed at a later point in time.

In a preferred embodiment, each of the above standard deviation values is a percentage factor that is produced by multiplication of the fuel mass flow produced through the respective injection nozzle by the standard operating value. In a further preferred embodiment, each of the mixture factors represents a mixture trim in the form of a percentage factor that produces the actual fuel mass flow of the respective injection nozzle by multiplication with the fuel mass flow produced by the respective injection nozzle in the normal mode of the internal combustion engine. The normal mode of the internal combustion engine means the operation thereof without measurement intervention, i.e. without mixture trimming. In other words, the normal mode corresponds to a mixture trim with the percentage factor of 1 or 100%.

In a further configuration of the method according to the invention, a respective equation of the system of equations also includes a desired air-fuel ratio (i.e. a target air-fuel ratio) for fuel combustion in a combustion chamber. In a further version, a respective equation of the system of equations also includes a mixture adjustment parameter for each injection nozzle, which adjusts the fuel mass flow through the respective injection nozzle that is produced when the nozzle is actuated to achieve smooth running of the internal combustion engine. Such mixture adjustment parameters are known in the control of an internal combustion engine and can as a rule be read out of the engine control unit. Nonetheless, the method according to the invention can also be used for internal combustion engines that do not carry out mixture adjustment using a mixture adjustment parameter. The set of mixture adjustment parameters is then to be set equal to 1 or 100% in each case.

In a particularly preferred version of the method according to the invention, a respective equation of the system of equations reads as follows $$\sum_i (gv_i \cdot cb_i \cdot o_i) + \frac{L_{st} \cdot \lambda_{soll} \cdot M}{MSHFM} \cdot L_{0,sum} = \frac{M}{\lambda_{real,k}}$$

in which i=1, . . . , M indexes the injection nozzles of the number of M injection nozzles of the respective cylinder bank;

in which $gv_i$ represents the mixture factors set in the corresponding test step in the form of a mixture trim, which is a percentage factor that produces the actual fuel mass flow through the respective injection nozzle by multiplication with the fuel mass flow produced by the respective injection nozzle in the normal mode of the internal combustion engine; in which all $cb_i$ are set to the value 1 or in which a respective $cb_i$ is a mixture adjustment parameter for a respective injection nozzle that adjusts the fuel mass flow generated through the respective injection nozzle when actuated to achieve smooth running of the internal combustion engine; in which $o_i$ is the standard deviation value for a respective injection nozzle that is a percentage factor that gives the fuel mass flow produced through the respective injection nozzle by multiplication with the standard operating value of the respective injection nozzle; in which $L_{st} \cdot \lambda_{soll}$ is a target air-fuel ratio that is identical for all combustion chambers during fuel combustion in the combustion chamber and Lst is the stoichiometric air-fuel ratio and $\lambda_{soll}$ represents a target lambda value of the fuel combustion in the combustion chamber; in which MSHFM is the valid air mass flow of the entire cylinder bank for the respective test step; in which $L_{0,sum}$ is the total leakage flow of all injection nozzles of the cylinder bank; in which $\lambda_{real,k}$ is the valid lambda value for the respective test step.

In a further preferred version, the system of equations that is processed in the method is solved by means of a matrix calculation. A robust solution of the equations is ensured thereby. In order to obtain an accurate and unique solution for the system of equations, the mixture factors for the respective test steps are preferably set so that after performing the test steps, each injection nozzle produces no fuel mass flow at least once (i.e. is turned off), produces a fuel mass flow at least once that is greater than a fuel flow that is produced by the respective injection nozzle in the normal mode of the internal combustion engine (i.e. the nozzle injects too richly), and produces a fuel mass flow at least once that is less than a fuel mass flow produced by the respective injection nozzle in the normal mode of the internal combustion engine (i.e. the nozzle injects too leanly). In addition or alternatively, the mixture factors for the respective test steps are preferably set so that there is at least one test step in which all the injection nozzles produce a fuel mass flow that corresponds to the fuel mass flow that is produced by the respective injection nozzle in the normal mode of the internal combustion engine (i.e. the nozzles inject without being adjusted) and/or that a test step in which at least one injection nozzle is not producing any fuel mass flow is followed by a test step in which each injection nozzle produces a fuel mass flow. In this way it is ensured that the individual injection nozzles pass through all sections of the injection quantity characteristic curve thereof, so that the reliable detection of injection nozzle defects is guaranteed.

In a further version of the method according to the invention, in the case of the detection of a leak it is further possible to determine which of the injection nozzles has a leak. For this purpose, the following steps are carried out for each injection nozzle: the mixture factor for the respective injection nozzle is successively varied starting from a standard value corresponding to the fuel mass flow produced by the respective injection nozzle in the normal mode of the internal combustion engine up to values with an increased injected fuel proportion of the respective injection nozzle, whereas the mixture factors of the other injection nozzles are held at the standard value; the rough running of the internal combustion engine is measured (for a sufficiently long time) for the standard value and for each changed value of the mixture factor of the respective injection nozzle; the value of the changed mixture factor at which essentially the same rough running occurs as for the standard value of the mixture factor is determined as a target value of the changed mixture factor; if the target value lies outside a predetermined range of values that corresponds to the lambda values for the combustion chamber exhaust gas flow that are greater than a predefined threshold value, the respective injection nozzle is detected as defective, in which the combustion chamber exhaust gas flow is the exhaust gas flow of the individual combustion chamber in which the respective injection nozzle is disposed.

If the target value lies within the predetermined range of values, no leakage defect of the respective injection nozzle is detected. The detection of the rough running of internal combustion engines with suitable measurement methods is known and is therefore not described in detail. The embodiment described above makes use of the knowledge that excessively rich injection mixtures and hence leaks can be detected by means of a relationship of the rough running to the mixture injection. In a preferred version, the range of values predetermined above is determined by means of a predetermined function that models the relationship between the rough running value and the lambda value for the combustion chamber exhaust gas flow or the mixture factor for the respective injection nozzle. The predetermined function is preferably a parabola.

Besides the method described above, the invention further concerns an engine test device for detecting defective injection nozzles for delivering fuel into the combustion chambers of an internal combustion engine. The engine test device is arranged to carry out the method according to the invention or one or more preferred versions of the method according to the invention. The engine test device can for example be an external engine test device or may also be integrated within the motor vehicle.

The invention further concerns a motor vehicle with an internal combustion engine and injection nozzles for delivering fuel into the combustion chambers of the internal combustion engine, in which the motor vehicle includes the engine test device described above. Exemplary embodiments of the invention are described in detail below. Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
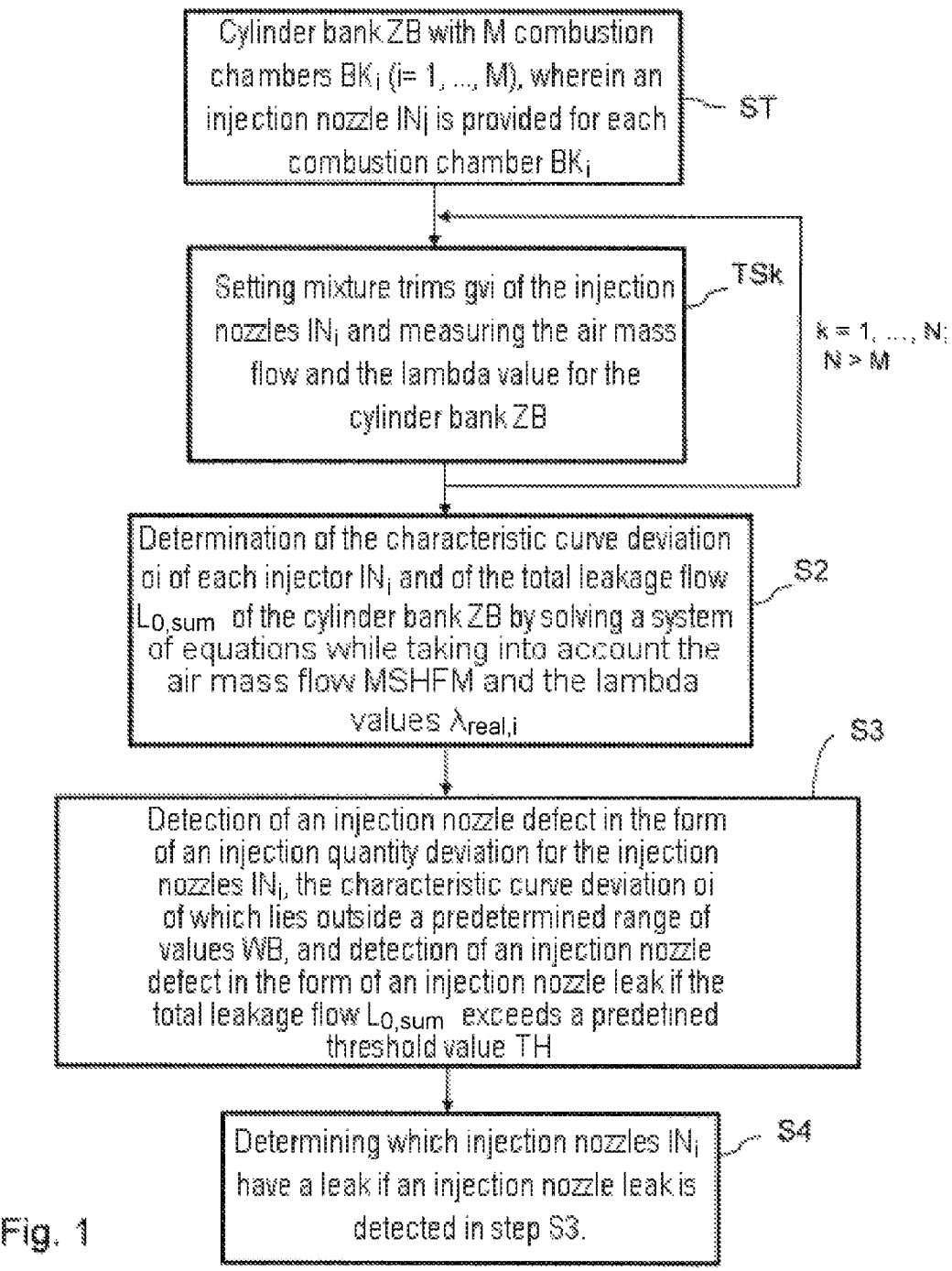
FIG. 1 is a flow chart that illustrates an embodiment of the inventive method.

The embodiment of the inventive method that is described below is based on the simple physical modeling of individual injection nozzles (also referred to below as injectors) in a cylinder bank of an internal combustion engine of a motor vehicle. With the modeling, mathematical equations are set up, with which the fault indicators of the injectors act as unknown variables. The equations are populated with measurement data based on a number of test steps, using which the unknown variables can then be resolved, whereby an accurate association of the respective fault indicator is carried out. Before details of the measurement process are described, first the physical modeling on which the invention is based is described.

During the modeling, an internal combustion engine includes at least one cylinder bank with M cylinders and combustion chambers that are formed therein. A cylinder bank is characterized by a common air mass flow that is in fractions delivered to all the cylinders of the bank, which is detected by means of an air mass meter (for example a hot film air mass meter), as well as by a common exhaust gas flow of all cylinders of the bank, the lambda value of which is determined by means of a common lambda probe for all cylinders. Without limiting the generality, an internal combustion engine with an individual injector per cylinder of the cylinder bank is considered below.

The theoretical fuel mass flow $\dot{m}_{K,th}$ in kg/h that is produced by a respective injector of the cylinder bank when actuated can be described as follows.

$$\dot{m}_{K,th} = \frac{MSHFM}{M_{L_{st} \lambda_{soll}}} \cdot \frac{1}{L_{st} \cdot \lambda_{soll}} \quad (1)$$

In this case MSHFM denotes the air mass flow delivered to the cylinder bank, M corresponds to the number of cylinders or injectors (for example M=4), $L_{st}$ is the stoichiometric air-fuel ratio for the combustion in the corresponding combustion chamber and $\lambda_{soll}$ is the desired target lambda value (also referred to as the combustion air ratio) of the combustion, measured in the exhaust gas flow of the corresponding cylinder bank.

The term fuel flow is also used below as equivalent to the term fuel mass flow. The real fuel flow of an injector results from the theoretical fuel flow as follows:

$$\dot{m}_{K,real} = o \cdot \dot{m}_{K,th}$$

In this case, o denotes the characteristic curve deviation of the injector in the case of a corresponding defect. o is a percentage factor that represents the deviation of the real fuel flow relative to the theoretical fuel flow. For o=1, the real fuel flow corresponds to the theoretical fuel flow, so that the corresponding injector has no characteristic curve defect. For o<1 the corresponding injector produces an excessively lean mixture with too low a fuel proportion. Accordingly, at o>1 the injector produces an excessively rich mixture with too high a fuel proportion.

The real fuel flow described above occurs in the normal mode of the internal combustion engine, i.e. in a mode in which there is no test intervention into the engine. During the test procedure that is described in detail further below, the real fuel flow can be trimmed, which is achieved by a suitable adjustment of a percentage factor gv, which is also referred to below as mixture trimming. In this case, the trimmed real fuel flow factor of the injector reads as follows:

$$gv \cdot o \cdot \dot{m}_{K,th}$$

gv=1 means that the injector is injecting without being trimmed, gv<1 means that the injector is performing lean injection and gv>1 means that the injector is performing rich injection. In the embodiment described here, an internal combustion engine is considered in which the fuel flow is further adjusted by means of a percentage adjustment factor in the form of a so-called cylinder-balancing factor. The factor is determined by the engine controller and is used to achieve very smooth running of the internal combustion engine.

While taking into account the cylinder-balancing factor, which is denoted below by cb, the real trimmed fuel flow factor of an injector is given as follows:

$$gv \cdot cb \cdot o \cdot \dot{m}_{K,th}$$

cb=1 means that no adjustment of the fuel flow of the injector takes place, cb<1 means that the fuel flow is made leaner and cb>1 means that the fuel flow is made richer. During the modeling of the injector, a real injector leak is further considered that represents a leakage flow $L_0$ of a flow of fuel that is emanating via a leak. The leakage flow is stated in kg/h.

Overall, the real fuel flow of an injector can thus be modeled as follows:

$$gv \cdot cb \cdot o \cdot \dot{m}_{K,th} + L_0 = gv \cdot cb \cdot o \cdot \left(\frac{MSHFM}{M} \cdot \frac{1}{L_{st} \cdot \lambda_{soll}}\right) + L_0$$

In this case, the fuel flow $\dot{m}_{K,th}$ has been replaced by the expression of the above equation (1).

Without limiting the generality, it is assumed that the internal combustion engine will combust stoichiometrically, i.e. $\lambda_{soll}=1$ applies. This yields overall the real fuel flow while taking into account the trimming and the cylinder-balancing factor as follows:

$$\dot{m}_{K,real} = gv \cdot cb \cdot o \cdot \frac{MSHFM}{M \cdot L_{st}} + L_0 \quad (2)$$

The mass flows of the individual injectors of the corresponding cylinder bank are now considered below, so that the index i is inserted that denotes a corresponding injector or the associated cylinder or the associated combustion chamber in the cylinder bank.

A lambda value $\lambda_{real}$ for a cylinder bank for all mass flows of the cylinder, which are combined in an exhaust system, is determined by means of a lambda probe. Owing to the conservation of mass, the real mass flows present at the lambda probe are given as follows:

$$\sum_i \dot{m}_{K,real,i} + \sum_i \dot{m}_{L,i}$$

Here $\dot{m}_{K,real,i}$ denotes the fuel flow of a respective injector and $\dot{m}_{L,i}$ denotes the air mass flow delivered to a respective cylinder. Here and below, the sums over the index i refer to a summation over the cylinders of the cylinder bank.

The lambda value $\lambda_{real}$ is obtained from the above mass flows present at the lambda probe as follows:

$$\lambda_{real} = \frac{\sum_i \dot{m}_{L,i}}{L_{st} \cdot \sum_i \dot{m}_{K,real,i}} \quad (3)$$

By inserting the fuel flow from the above equation (2) into the equation (3), the following lambda value at the lambda probe is obtained:

$$\lambda_{real} = \frac{MSHFM}{L_{st} \cdot \left(\frac{MSHFM}{M \cdot L_{st}} \cdot \sum_i (gv_i \cdot cb_i \cdot o_i) + \sum_i L_{0,i}\right)}$$

In this equation, is has been further taken into account that $MSHFM=\sum_i \dot{m}_{L,i}$ applies.

By means of a transformation as well as the use of the expression $L_{0,sum}=\sum_i L_{0,i}$, $\lambda_{real}$ can be written as follows:

$$\lambda_{real} = \frac{M}{\left(\sum_i (gv_i \cdot cb_i \cdot o_i) + \frac{L_{st} \cdot M}{MSHFM} \cdot L_{0,sum}\right)} \quad (4)$$

Converting the equation (4) gives the following basic equation, which is used within the embodiment that is described here for the detection of defective injection nozzles:

$$\sum_i (gv_i \cdot cb_i \cdot o_i) + \frac{L_{st} \cdot M}{MSHFM} \cdot L_{0,sum} = \frac{M}{\lambda_{real}} \quad (5)$$

As described in detail below, the above equation (5) is set up for a plurality of test steps with differently set mixture trims $gv_i$, from which different lambda values result. In this case, N test steps are considered, in which N is greater than the number M of cylinders. In this way we get a system of equations with N equations (5), from which the unknowns in the form of the M characteristic curve deviations $o_i$ as well as of the total leakage flow $L_{0,sum}$ can be determined. In this system of equations, the air mass flow MSHFM is the air mass flow measured over the entire test process of the individual test steps and averaged, which is approximately assumed to be constant. The lambda value that is used below $\lambda_{real,k}$ is the lambda value $\lambda_{real}$ determined for the respective test step k (k=1, ..., N) and constitutes the average value of the individual lambda values measured in the period of time of the respective test step. The individual cylinder-balancing factors $cb_i$ can be read out from the engine control unit.

According to the above implementations, a linear system of equations of N equations, which reads as follows in matrix notation, is thus obtained from the above equations:

$$M_{gv} \cdot V_o = V_\lambda \quad (6)$$

In this case, $M_{gv}$ denotes the predetermined test matrix, which defines the structure of the tests and has the dimension N×(M+1).

A cylinder bank with M=4 cylinders is considered below without limiting the generality. The test matrix is then an N×5 Matrix, which reads as follows:

$$M_{gv} = \begin{pmatrix} gv_{1,1} & gv_{1,2} & gv_{1,3} & gv_{1,4} & 1 \\ gv_{2,1} & gv_{2,2} & gv_{2,3} & gv_{2,4} & 1 \\ gv_{3,1} & gv_{3,2} & gv_{3,3} & gv_{3,4} & 1 \\ \ldots & \ldots & \ldots & \ldots & 1 \\ gv_{N,1} & gv_{N,2} & gv_{N,3} & gv_{N,4} & 1 \end{pmatrix}$$

A corresponding row k refers here to the $k^{th}$ test step and a corresponding column i to the cylinder i. Thus the correspondingly adjusted trims of the individual cylinders i in the respective test steps k are denoted by the values $gv_{k,i}$. The trimming is achieved here by suitably adjusting the injection time of the respective injection nozzle. $gv_{k,i}=0$ means that the corresponding injector is not injecting any fuel and is thus turned off. In contrast, $gv_{k,i}<1$ means that the corresponding injector is injecting leaner, whereas $gv_{k,i}>1$ means that the corresponding injector is injecting richer. $gv_{k,i}=1$ represents the untrimmed state of the injector without external trimming intervention.

As given by the implementations further below, the total leakage flow is included in the linear system of equations by the last column of the above matrix $M_{gv}$.

In a specific example, in the above Matrix $M_{gv}$ a second matrix row (1,3 0 1,3 1,3 1) means that in the second test step cylinders 1, 3 and 4 are set 30% richer and cylinder 2 is turned off.

In the above matrix equation (6), the vector $V_0$ represents the defect vector of the four injectors of the cylinder bank being considered, the solution to which is being sought. This vector reads as follows:

$$V_o = \begin{pmatrix} E_{o1} \\ E_{o2} \\ E_{o3} \\ E_{o4} \\ E_{Lo,sum} \end{pmatrix} = \begin{pmatrix} cb_1 \cdot o_1 \\ cb_2 \cdot o_2 \\ cb_3 \cdot o_3 \\ cb_4 \cdot o_4 \\ L_{st} \cdot 4/MSHFM \cdot L_{0,sum} \end{pmatrix} \quad (7)$$

As already mentioned, $o_1$ to $o_4$ denote the corresponding characteristic curve deviations of the respective injector, in which a value of the characteristic curve deviation of greater than 1 means that the injector is injecting a mixture that is too rich, a value of 1 means that the injector is injecting properly, and a value of less than 1 means that the injector is injecting a mixture that is too lean. As also mentioned above, $L_{0,sum}$ denotes the sum of the leaks of all the injectors in a bank in kg/h. Furthermore, the factors $cb_1$ to $cb_4$ are the corresponding cylinder-balancing factors, which can be read out of the engine control unit. $L_{st}$ is the stoichiometric air-fuel ratio that has already been defined above, which lies for example between 14 and 15 kg/kg depending on the fuel used in the internal combustion engine. MSHFM is the air mass flow across the hot film air mass meter that is measured and determined over the entire test process.

In the above matrix equation (6), $V_\lambda$ denotes the vector of the lambda values $\lambda_{real,k}$ belonging to the test steps of a four cylinder engine. The vector reads as follows:

$$V_\lambda = \begin{pmatrix} 4/\lambda_{real,1} \\ 4/\lambda_{real,2} \\ 4/\lambda_{real,3} \\ \ldots \\ 4/\lambda_{real,N} \end{pmatrix}$$

Within the context of the embodiment that is described here, the above equation (6) is transformed as follows by means of a matrix operation using the transposed matrix $M_{gv}^T$:

$$M_{gv}^T \cdot M_{gv} \cdot V_o = M_{gv}^T \cdot V_\lambda$$

The vector $V_0$ is determined therefrom by means of a matrix operation with an inverse matrix as follows:

$$V_o = (M_{gv}^T \cdot M_{gv})^{-1} \cdot (M_{gv}^T \cdot V_\lambda)$$

The individual characteristic curve deviations as well as the total leakage flow can now be determined from the vector while taking into account the above equation (7) as follows:

$$o_1 = E_{o1}/cb_1$$

$$\ldots$$

$$o_i = E_{oi}/cb_i$$

$$\ldots$$

$$L_{0,sum} = E_{L0,sum}/(L_{st} \cdot 4/MSHFM)$$

If the characteristic curve deviation of an injector lies outside a predetermined range of values, the injector is classified as defective, i.e. that it has an injection quantity deviation. An injection quantity deviation is distinguished from a leak as the injection quantity deviation only occurs when the injector is actuated or during the operation of the injector, whereas the leak is also present when the injector is turned off and therefore remains constant through a mixture trim. Moreover, a threshold value is defined for the total leakage flow $L_{0,sum}$. If the threshold value is exceeded, an injection leak is detected, but this cannot initially be associated with a defined injector. In a specific version of the inventive method, however, the injectors that have a leak are identified, as is yet to be described in detail further below.

FIG. 1 combines in a flow chart the significant steps of the just described method again. The starting point is a cylinder bank ZB with M combustion chambers $BK_i$, in which a respective injection nozzle $IN_i$ is provided for each combustion chamber $BK_i$. The starting point is denoted in FIG. 1 by ST. During the test procedure, in respective test steps TSk (k=1, . . . , N, N>M) the mixture trims of the injection nozzles $IN_i$ are changed and at the same time the air mass flow that is delivered to the cylinder bank ZB as well as the lambda value of the exhaust gas that is discharged from the bank are measured. The air mass flow value MSHFM, which is assumed to be approximately constant, as well as a valid lambda value $\lambda_{real,k}$ for the respective test step $TS_k$ are obtained therefrom by averaging the measurement values.

After performing the N test steps, in a step S2 the characteristic curve deviation $o_i$ of each injector $IN_i$ and the total leakage flow $L_{0,sum}$ of the cylinder bank ZB are determined by solving a system of equations based on the matrix operations that were set out above. This incorporates inter alia the air mass flow value MSHFM as well as the lambda values the individual test steps. Finally, in step S3 an injection nozzle defect is $\lambda_{real,k}$ of detected in the form of an injection quantity deviation for those injection nozzles $IN_i$, the characteristic curve deviation $o_i$ of which lies outside a predetermined range of values WB. Similarly, an injection nozzle defect is detected in the form of an injection nozzle leak if the total leakage flow $L_{0,sum}$ exceeds a predefined threshold value TH. The type of defect of the injection nozzles can be detected in this way. The range of values WB preferably lies between $0.8 < o_i < 1.2$. Furthermore, the threshold value TH is preferably selected so that it lies at about 0.25% of the expected fuel flow of the corresponding injector in the current test step. Values in the range between 0.65 and 1.4 are preferably set as values for $gv_i$, or in addition the value $gv_i=0$, which corresponds to turning off the corresponding injector.

In order to determine a unique solution of the system of equations within the above test steps TSk, the values of $gv_i$ are preferably selected so that after running through the test steps each cylinder is turned off at least once, is made leaner once and made richer once. Furthermore, the test steps preferably contain a test step in which all values of $gv_i$ have been set to 1. Moreover, a test step in which no cylinder has been turned off preferably follows a test step in which at least one cylinder has been turned off. With the above method two or more cylinder banks of an individual internal combustion engine may also be tested at the same time. During this, while performing the test steps it is ensured that two banks never turn off a cylinder at the same time. For example, the test matrix $M_{gv}$ of one cylinder bank can be produced by a permutation of the rows of the test matrix of the other cylinder bank.

In the embodiment of FIG. 1, step S3 is followed by a further step S4, in which it is also determined which injection nozzles $IN_i$ have a leak if an injection nozzle leak has been detected in step S3. A version for carrying out step S4 is described below.

Figure 2:
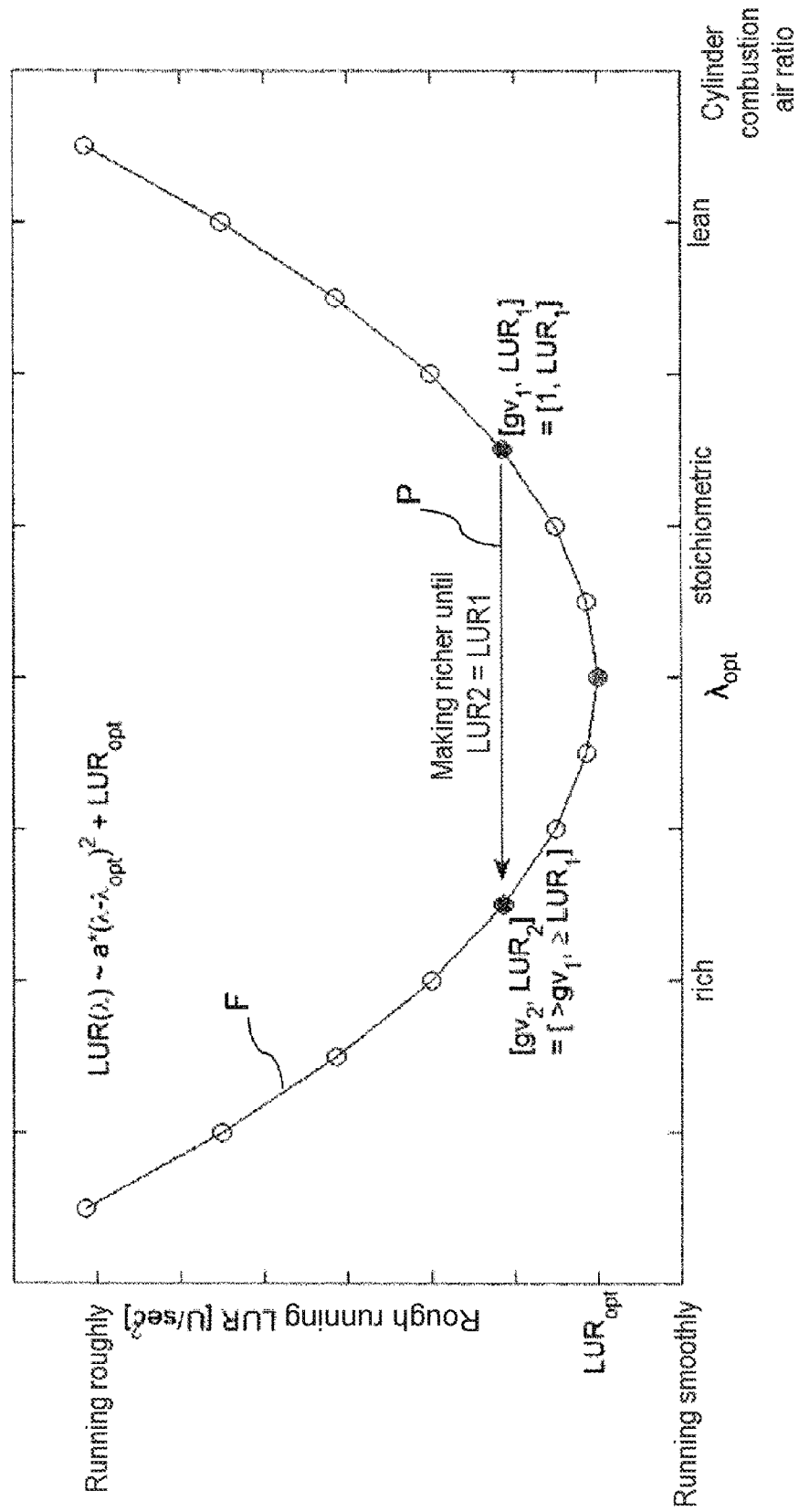
FIG. 2 is a diagram that illustrates the determination of injection nozzles with a leak.

For determining which injection nozzle has a leak according to step S4, a measurement method is carried out separately for each injection nozzle, in which for the injection nozzles for which the method is not yet being implemented, the mixture trim is set to the value 1. During the measurement of the corresponding injection nozzle, the rough running of the internal combustion engine is detected for different mixture trims of the injection nozzle. The detection of the rough running in an internal combustion engine is known and is therefore nor described further in detail. It is realistically assumed that the rough running LUR is an essentially parabolic function of the cylinder combustion air ratio $\lambda$, of the corresponding cylinder in which the injection nozzle under consideration is disposed. Without limiting the generality, in the embodiment that is described here the relationship between the rough running LUR and the cylinder-fuel air ratio $\lambda$, shown in the diagram of FIG. 2 is assumed. The relationship is based on a function F, which has a minimum rough running value $LUR_{opt}$ with an associated cylinder combustion air ratio $\lambda_{opt}$. Mathematically, the function F is described as follows:

$$LUR(\lambda) = a \cdot (\lambda - \lambda_{opt})^2 + LUR_{opt}$$

The parameters a, $\lambda_{opt}$ and $LUR_{opt}$ have been determined empirically for the corresponding internal combustion engine for example. In the method below only the parameter $\lambda_{opt}$ is required.

For the measurement of the corresponding injection nozzle, the rough running LUR is first detected in the original state with a neutral mixture trim $gv_1=1$. Here and below it should be noted that the mixture trim $gv_1$ or the mixture trim $gv_2$ mentioned further below no longer indicate a corresponding cylinder, but a corresponding trim value of the cylinder that has just been set. Following measurement of the original state, the mixture produced with the injection nozzle is made richer consecutively and stepwise by means of $gv > 1$ and the rough running is determined again for the corresponding values of gv. In other words, along the horizontal arrow P, values on the parabolic function F are determined. Once a mixture trim $gv_2 > 1$ with rough running $LUR_2 \geq LUR_1$ has been reached for the first time, the value $\lambda_1$ of the cylinder combustion air ratio $\lambda$ for the mixture trim $gv_1$ can be determined therefrom, as can be seen from the following derivation.

Owing to the symmetry of the parabolic function F, the following relationship applies:

$$\lambda_{opt} - \lambda_2 = \lambda_1 - \lambda_{opt} \quad (8)$$

Here $\lambda_1$ denotes the combustion air ratio prevailing in the cylinder for the mixture trim $gv_1$ and $\lambda_2$ denotes the combustion air ratio prevailing in the cylinder for the mixture trim $gv_2$ of the respective injector.

The cylinder combustion air ratio changes approximately with the mixture trim, i.e. the following applies:

$$\Delta\lambda = -\Delta gv \Rightarrow \lambda_1 - \lambda_2 = gv_2 - gv_1 \quad (9)$$

The following results from equations (8) and (9):

$$\lambda_1 = \lambda_{opt} + \frac{gv_2 - gv_1}{2}$$

As $gv_1=1$ applies, the following determination equation for $\lambda_1$ results:

$$\lambda_1 = (\lambda_{opt} - 0.5) + \frac{gv_2}{2} = K + \frac{gv_2}{2} \quad (10)$$

In this equation, the variable K=const. is inserted, which is a function of $\lambda_{opt}$ and can be determined for a specific engine.

A leak in the measured injection nozzle then exists if the value $\lambda_1$ for the mixture trim $gv_1=1$ is too rich. Consequently, a more suitable threshold value for $\lambda_1$ is determined, in which if $\lambda_1$ is less than the threshold value a leak in the corresponding injection nozzle is detected. As according to the above equation (10) $gv_2$ is a linear function of $\lambda_1$, in the embodiment that is described here a threshold value for $gv_2$ corresponding to the threshold value for $\lambda_1$ is determined. In other words, the method for the determination of individual cylinder injector leaks proceeds in such a way that the value $gv_2$ at which the rough running of the engine essentially corresponds to the rough running for the mixture trim $gv_1$ is determined consecutively by varying the mixture trim starting from $gv_1=1$. If the value of $gv_2$ is less than a predefined threshold value, a leak of the corresponding injector is detected. If this is not the case, no leakage defect for this injector is detected. Typical values for $gv_2$, in which a leak is detected if the mixture value is less than the values, lie between 1.2 and 1.4.

The embodiments of the invention described above have a series of advantages. In particular, the injector test that is carried out is more specific compared to other injector tests, as it enables an accurate indication of the type of the defect. Specifically, a distinction is made between a fuel quantity deviation defect or a characteristic curve deviation defect and a leakage defect. In this case the injector test is at the system level, since the injector is evaluated in the installed and unaltered state while the engine is running and is not measured in the uninstalled state. While conducting the injector tests, the correct engine boundary conditions (pressure, temperature, mass flows, mechanical stresses, transients and similar) are already set, so that the test can be reproduced well. Moreover, the injector test can be carried out more rapidly and inexpensively, as the injectors are analyzed in the installed state. The injector test is meaningful, since it not only determines whether an injector is in order or defective, but also the nature of the defect. Moreover, matrix computation algorithms used during the analysis are significantly more robust than purely tabular comparisons, such as are carried out in other injector tests. The injector test is further insusceptible to malfunctions, as significantly more test steps (equations) than unknown variables can be used. In other words, in the case of a suitably large number of test steps the analysis responds significantly less susceptible to problems owing to statistical measurement errors. Moreover, in a preferred version the symmetrical measurement of the injector is guaranteed by turning each injector off, making it leaner and making it richer at least once during the course of the test steps in order to gain an indication of the behavior thereof on all sections of the quantity characteristic curve thereof.

REFERENCE CHARACTER LIST

| | |
|---|---|
| ZB | cylinder bank |
| $BK_i$ | combustion chamber |
| M | number of injection nozzles |
| $IN_i$ | injection nozzle |
| $gv_i$ | mixture trims |
| k | index of the test step |
| N | number of test steps |
| $o_i$ | characteristic curve deviation |
| $L_{0,\,sum}$ | total leakage flow |
| MSHFM | air mass flow |
| $\lambda_{real,\,k}$ | lambda value valid in the respective test step |
| WB | range of values |
| TH | threshold value |
| F | function |
| LUR | rough running |
| $\lambda$ | cylinder-combustion air ratio |

The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the embodiments of the invention should be construed to include everything within the scope of the appended claims and equivalents thereof.

What is claimed is:

1. A method for detecting defective injection nozzles for delivering fuel into the combustion chambers of an internal combustion engine, in particular in a motor vehicle, wherein the internal combustion engine comprises one or more cylinder banks, wherein a respective cylinder bank comprises a plurality of cylinders, each with a combustion chamber formed therein and at least one injection nozzle and wherein a common air mass flow is delivered to the combustion chambers of a respective cylinder bank and a common flow of exhaust gas is discharged from the combustion chambers of a respective cylinder bank, wherein for a respective cylinder bank in the idle mode of the internal combustion engine, a number of consecutive test steps is carried out that is greater than the number of cylinders of the respective cylinder bank, wherein in a respective test step for the individual injection nozzles mixture factors are set that each determine the fuel mass flow produced by the individual injection nozzle when actuated, wherein for at least some consecutive test steps one or more mixture factors is/are changed from one test step to the next and wherein during the test steps measurements of the lambda value of the exhaust gas flow that is led away from the cylinder bank and measurements of the air mass flow that is delivered to the cylinder bank are carried out;

after performing the number of test steps, a standard deviation value for each injection nozzle as well as a total leakage flow are determined, wherein the standard deviation value for a respective injection nozzle describes a deviation of the fuel mass flow produced by the respective injection nozzle from a standard operating value of the respective injection nozzle and the total leakage flow describes the fuel mass flow that is caused by the leaks of all the injection nozzles of the respective cylinder bank;

the determination of the standard deviation values for the respective injection nozzles and of the total leakage flow is carried out such that a system of equations is solved by computation, which system comprises an equation for a respective test step that describes the standard deviation values and the total leakage flow as a function of the mixture factors set in the respective test step, a lambda value that is valid for the respective test step and that is derived from the measurements of the lambda value and an air mass flow that is valid for the respective test step and that is derived from the measurements of the air mass flow;

in the case in which at least one standard deviation value for a respective injection nozzle lies outside a predefined range of values, a first injection nozzle defect is detected in the respective cylinder bank in the form of an injection quantity deviation of at least one injection nozzle, and in the case in which the total leakage flow is greater than a predetermined threshold value, a second injection nozzle defect is detected in the respective cylinder bank in the form of a leak of at least one injection nozzle.

2. The method as claimed in claim 1, wherein an output is produced regarding for which injection nozzles the standard deviation value lies outside the predefined range of values, and the injection nozzles are detected as defective.

3. The method as claimed in claim 2, wherein the standard deviation values each represent a percentage factor that provides the fuel mass flow produced by the respective injection nozzle by multiplication with the standard operating value.

4. The method as claimed in claim 3, the mixture factors each represent a mixture trim in the form of a percentage factor that provides the actual fuel mass flow of the respective injection nozzle by multiplication with the fuel mass flow produced by the respective injection nozzle in the normal mode of the internal combustion engine, where normal mode is when fuel is provided to produce a stoichiometric reaction.

5. The method as claimed in claim 4, wherein a respective equation of the system of equations further comprises a target air-fuel ratio for fuel combustion in a combustion chamber.

6. The method as claimed in claim 5, wherein the respective equation of the system of equations further comprises a mixture adjustment parameter for each injection nozzle that adjusts the fuel mass flow produced by the respective injection nozzle when actuated to achieve smooth running of the internal combustion engine.

7. The method as claimed in claim 6, wherein the respective equation of the system of equations reads as follows:

$$\sum_i (gv_i \cdot cb_i \cdot o_i) + \frac{L_{st} \cdot \lambda_{soll} \cdot M}{MSHFM} \cdot L_{0,sum} = \frac{M}{\lambda_{real,k}}$$

wherein i=1, . . . , M indexes the injection nozzles of the number of M injection nozzles of the respective cylinder bank;

wherein $gv_i$ represent the mixture factors set in the corresponding test step in the form of a mixture trim, which is a percentage factor that provides the actual fuel mass flow of the respective injection nozzle by multiplication with the fuel mass flow produced by the respective injection nozzle in the normal mode of the internal combustion engine;

wherein all $cb_i$ are set to the value 1 or wherein a respective $cb_i$ is a mixture adjustment parameter for a respective injection nozzle that adjusts the fuel mass flow produced by the respective injection nozzle when actuated to achieve smooth running of the internal combustion engine;

wherein $o_i$ is the standard deviation value for a respective injection nozzle, which is a percentage factor that provides the fuel mass flow produced by the respective injection nozzle by multiplication with the standard operating value of the respective injection nozzle;

wherein $\lambda_{soll}$ is a target air-fuel ratio for fuel combustion in the combustion chamber and is identical for all combustion chambers, and in this case $L_{st}$ represents the stoichiometric air-fuel ratio;

wherein MSHFM is the valid air mass flow for the respective test step;

wherein $L_{0,sum}$ is the total leakage flow;

wherein $\lambda_{real,k}$ is the valid lambda value for the respective test step.

8. The method as claimed in claim 7, wherein the system of equations is solved by means of a matrix computation.

9. The method as claimed in claim 8, wherein the mixture factors for the respective test steps are set such that after running through the test steps each injection nozzle produces no fuel mass flow at least once, produces a fuel mass flow that is greater than a fuel mass flow produced by the respective injection nozzle in the normal mode of the internal combustion engine at least once, and produces a fuel mass flow that is smaller than a fuel mass flow produced by the respective injection nozzle in the normal mode of the internal combustion engine at least once.

10. The method as claimed in claim 9, wherein the mixture factors for the respective test steps are set such that there is at least one test step in which all injection nozzles produce a fuel mass flow that corresponds to a fuel mass flow produced by the respective injection nozzle in the normal mode of the internal combustion engine, and/or that a test step in which at least one injection nozzle produces no fuel mass flow is followed by a test step in which each injection nozzle produces a fuel mass flow.

11. The method as claimed in claim 10, wherein in the case in which the total leakage flow is greater than the predetermined threshold value, the following steps are carried out for each injection nozzle:

the mixture factor for the respective injection nozzle is successively varied starting from a standard value, which corresponds to the fuel mass flow produced by the respective injection nozzle in the normal mode of the internal combustion engine, up to values with an increased injected fuel proportion of the respective injection nozzle, whereas the mixture factors of the other injection nozzles are kept at the standard value;

a rough running of the internal combustion engine is measured for the standard value and each altered value of the mixture factor of the respective injection nozzle;

as a target value of the changed mixture factor, the value of the changed mixture factor is determined for which essentially the same rough running occurs as for the standard value of the mixture factor;

if the target value lies outside a predetermined range of values that correlates with lambda values for the combustion chamber exhaust gas flow that are greater than a predefined threshold value, the respective injection nozzle is detected as defective, wherein the combustion chamber exhaust gas flow is the exhaust gas flow of the individual combustion chamber in which the respective injection nozzle is disposed.

12. The method as claimed in claim 11, wherein the predetermined range of values is determined by means of a predetermined function that models the relationship between the rough running and the lambda value for the combustion chamber exhaust gas flow or the mixture factor for the respective injection nozzle, wherein the predetermined function is preferably a parabola.

* * * * *